Oct. 18, 1966 F. BAUER 3,279,269
DEVICE FOR CONVERTING RECTILINEAR MOTION INTO ROTARY MOTION
Filed June 10, 1963 2 Sheets-Sheet 1
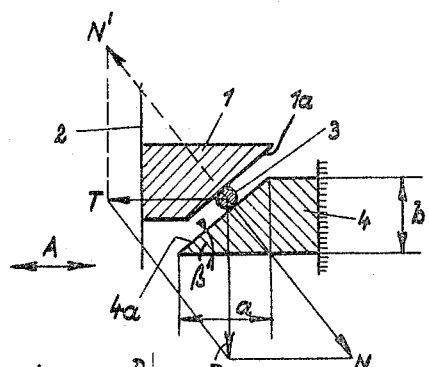
Fig. 1 PRIOR ART
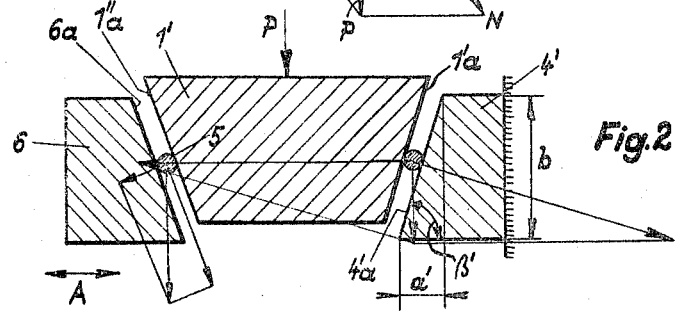
Fig. 2
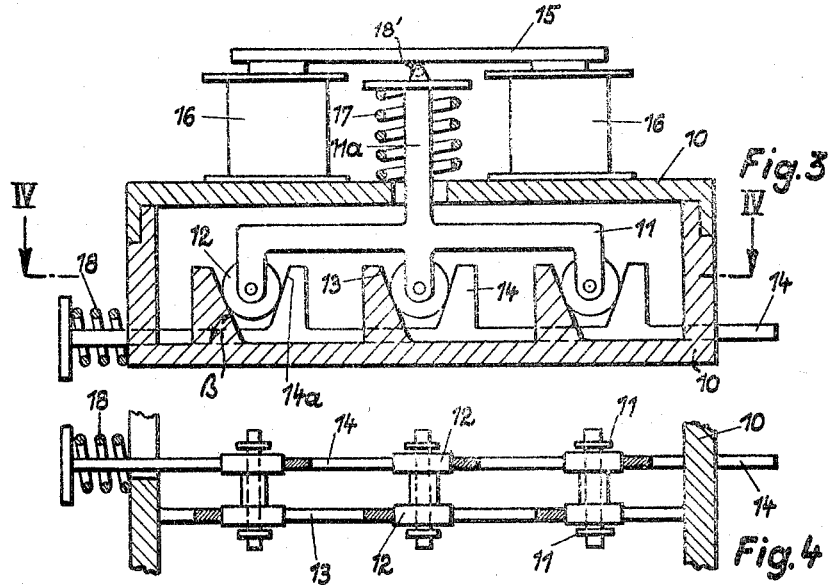
Fig. 3
Fig. 4
Inventor:
FRANK BAUER
by
Kurt Kelman
AGENT

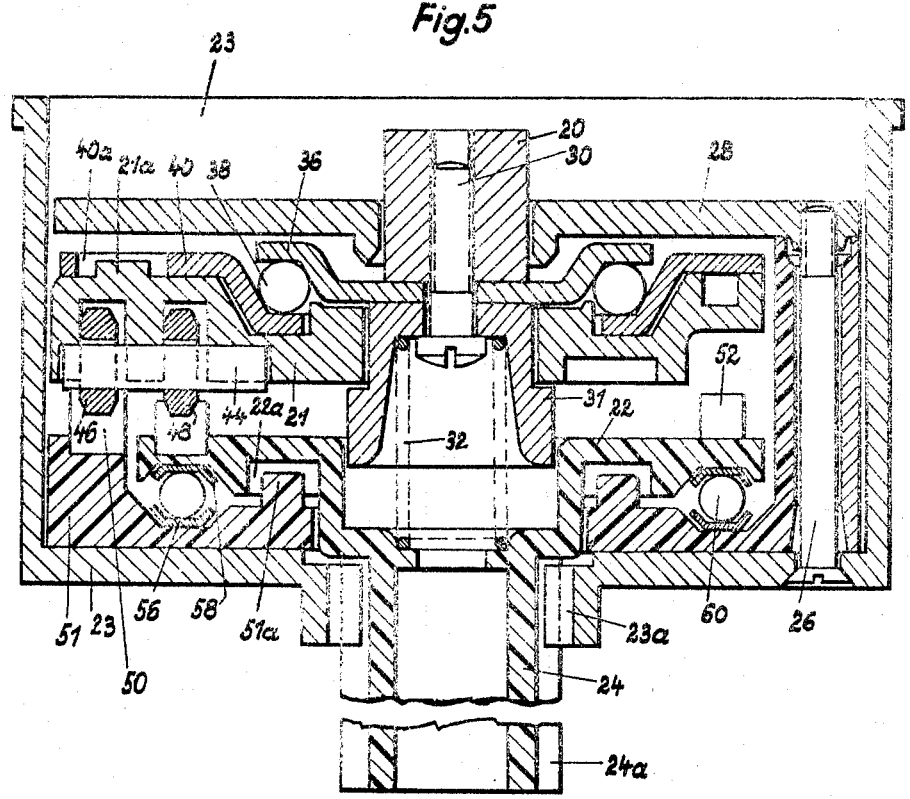

United States Patent Office

3,279,269
Patented Oct. 18, 1966

3,279,269
DEVICE FOR CONVERTING RECTILINEAR MOTION INTO ROTARY MOTION
Frank Bauer, Vienna, Austria, assignor to Hubert L. Naimer, Vienna, Austria
Filed June 10, 1963, Ser. No. 286,618
Claims priority, application Austria, June 26, 1962, A 5,097
10 Claims. (Cl. 74—99)

This invention relates to devices for converting rectilinear motion, which is preferably short, into rotary motion and is intended in particular for use with rotary magnets.

In connection with the present invention there is to be understood by a rotary magnet an electromagnetic device that serves to convert short rectilinear movements imparted by a magnet to an armature adapted to move rectilinearly and axially, into a rotary motion, the rectilinear movement amounting as a rule only to fractions of a centimetre and the rotary motion being about 20–60°. In known devices of this type, schematically illustrated in FIG. 1, a driving part 1 may be assumed to be rotatable about the axis 2, regarded as below the plane of the drawing, and mounted so as to be movable in the direction of this axis. It acts, preferably via rollers 3, against the stationary part 4 which forms an abutment in the path of movement. The opposed bounding surfaces of the parts 1 and 4 thus form cooperating camming surfaces 1a, 4a which are here shown as being straight; basically they act like inclined planes with angle of inclination $\beta$, base $a$ and height $b$, but need not be planes and in practice will generally not be planes; the base line $a$ determines the amount of rotation produced.

The force P (in the case of rotary magnets the magnetic force), acting on the driving part 1 and to be converted into an angular force acts on the ball or roller 3 and is there resolved into a horizontal component T which sets the rotary member 1 in motion and a normal force N which (in addition to its force of reaction N') causes friction losses along the paths of movement 1a, 4a. Without these friction losses, $P.b = T.a$, where $b$ is the displacement of the part 1 and $a$ its angular movement. In this case the efficiency of force conversion would be a maximum, viz.

$$\frac{T.a}{P.b} = 1$$

In practice, however, the unavoidable friction that arises between the members 1 and 4 reduces the efficiency to $$\eta = 1 - \frac{Ko}{\sin 2\beta}$$

in which Ko represents the friction. From this equation it can be seen that, as $\beta$ increases, the friction losses continually decrease; the best value is for $2\beta = 45°$, but in practice this value cannot be nearly approached.

Known devices for converting rectilinear motion into rotary motion make use of rolling bodies, generally steel balls, between the movable parts, these bodies rolling on hardened camming surfaces. The manufacture of such surfaces is difficult and the production costs for such devices are therefore high. A basic difficulty encountered in known methods of making such devices arises as follows:

Relatively large angles of rotation are often required (for example 45°). These angles of rotation however correspond to very small magnet movements since the attracting force thereof attains high values only in the region of narrow air gaps. If therefore the inclined plane is to be given a steep angle the change-over must take place on the smallest possible diameter viz. in the direct vicinity of the axis. For reasons of space this calls for very small elements and at the same time for great limitation in their number. Consequently, only precision-finished parts made from hardened steel can be used, so as to obtain devices of sufficient operating life. If the inclined plane is, on the other hand, located further outwards at the periphery then the angles of inclination naturally become very small. Because of this the components of force in the direction of motion conversion become very small, high pressures must be exerted by the magnet in order to provide a definite torque, and the efficiency, which is impaired by friction losses, becomes lower.

The object of the present invention is to provide a device for the conversion of a rotary motion into a rectilinear motion, which has very low friction losses and can be manufactured in a simple manner. A further object of the invention is to construct such a device in such manner that it can be made from synthetic material with the retention of a satisfactory efficiency.

In the drawings, FIG. 1 schematically shows the action of a conventional device for the transformation of a rectilinear motion into a rotary motion, FIGS. 2, 3 and 4 schematically illustrate the principle of the invention, FIG. 4 being a view on the line IV—IV of FIG. 3; and FIG. 5 shows in axial section and by way of example an embodiment of a device according to the invention.

Instead of one driving part 1 which serves simultaneously as a rotary member providing torque, as in FIG. 1, the device of FIG. 2 provides driving part 1' which is under the action of the force P and cooperates with its camming surface 1'a with the fixed abutment part 4'. The driving part 1' also acts via a rolling member 5 and a second camming surface 1''a on the rotary member 6 which constitutes a separate driving part and, in turn, has a camming surface 6a. The rotary member 6, like the member 1 of FIG. 1, is movable in the direction of the arrow A and this movement is the angular movement imparted to the rotary member 6. The angle of inclination $\beta'$ of the inclined planes 4'a and 6a are larger than angle $\beta$ of FIG. 1 viz the ratio $b:a'$ is larger than $b:a$. If the required angular movement is represented by $a$ then it will be seen that it is sufficient for the movement of the part 1' relative to 4' and of the part 6 relative to the part 1' to be of the dimension $a/2$ in order that part 6 may be capable of executing altogether $a$ total displacement or total rotation of amount $a$ in the direction of the arrow A. By dividing the required angular movement $a$ into two parts it is thus possible, with corresponding increase of the angle $\beta$ (the shape of the camming surface which need not be a straight line being disregarded) to obtain improved efficiency.

Apart from the increased efficiency resulting from the increase of the angle $\beta$ the device according to the invention has the further advantage that the transmission of the force P is effected by twice the number of inclined planes and therefore twice the number of groups of roller members as in the earlier construction shown in FIG. 1. Each of these groups of roller members now has to transmit only the force $P/2$, by reason of the halving of the force P. This results in lower pressures on the inclined planes or camming surfaces, and there is no longer any need to make these cooperating parts (roller members and camming surfaces) from hard material, for example steel, on the contrary, it is possible for these parts to be made of less hard materials and even to use synthetic materials since increase of the angle $\beta'$ also reduces wear. The rotary member 6, in contrast to the part 1 of FIG. 1 which is a driving part and also a rotary member, does not execute any axial movement but a purely rotary movement, while part 1 of FIG. 1 executes a helical movement; similarly the part 1' of FIG. 2 also executes a helical movement but with an angular component $a'$ which is smaller than the angular component $a$ in FIG. 1.

The reduction of the pressure acting on the roller members and the paths of the roller members in the construction according to FIG. 2, is a particularly important advantage if these cooperating parts are to be made from synthetic material, because their co-efficients of friction are often dependent on pressure. Thus for example the co-efficient of friction of polyamides varies between 0.05 and 0.5 according to the surface pressure employed, as compared with a value of 0.2 for steel to steel, which value is to a great extent independent of pressure.

The value K of the friction is determined, taking into consideration this dependency on the prevailing surface pressure, by the formula $$K = Ko + \frac{Kl}{No} \cdot N$$

in which $Ko$ represents the small basic value of the friction which is independent of pressure and $Kl/No$ represents the component of the friction that increases with increase in the surface N, and which together with the basic value $Ko$ gives the total value, dependent on pressure, of the friction.

Substitution in the above formula for the efficiency is the equation $$\eta_1 = 1 - \frac{Ko}{\sin 2\beta}\left(1 + \frac{K2}{\sin \beta}\right)$$

The new expression appearing in brackets is thus the smaller the larger is the angle $\beta$. From this it will be seen that, when using synthetic materials in which the friction is dependent on pressure, it is very desirable to make the angle of inclination of the inclined planes large.

The principle on which the inventive concept is carried into practice will now be described with reference to FIG. 3 which shows diagrammatically a device according to the invention for converting a rectilinear motion into a rotary motion.

Within a housing 10 the driving part 11 is mounted so as to be movable in the vertical direction and also in the horizontal direction. It acts via rollers 12, which bear against stationary inclined surfaces 13, on the rotary member 14 which is movable only in the horizontal direction. For the sake of clarity the illustration represents the rotary motion of the part 14 as developed into a rectilinear motion. The driving part 11 has a shank 11a that projects upwardly. The armature 15 of an electro-magnet 16 is guided in any suitable manner and, as soon as the magnet 16 is energized, the armature 15 moves the driving part 11 downwards against the action of a spring 17. In order to reduce the friction, the armature 15 acts on a roller 18' carried by shank 11a. Instead of the electro-magnets 16 that cause the driving movement any other device providing a rectilinear driving movement could of course be used.

As soon as the electro-magnet 16 is energized, the armature 15 is attracted and moves driving part 11 downwards, compressing the spring 17. The rollers 12 move downwardly along the camming surfaces 13, also moving to the right (in the drawing) in accordance with the angle $\beta$. The downward movement of the rollers 12 also effects, via the camming surfaces 14a of the rotary member 14 and in association with the lateral movement of the rollers 12, a correspondingly increased displacement of the rotary member 14 to the right, this movement preferably energizing a return spring 18. When excitation of the magnets 16 ceases or the force acting on the shank 11a is withdrawn, the part 11 returns to its initial position under the action of the spring 17 and the rotary member 14 returns to its initial position under the action of the spring 18. The cooperation of the parts 11, 12, 13 and 14 corresponds exactly to that of the parts 1', 4' and 6 of FIG. 2.

If it is not desired to convert a rectilinear motion (of the part 15) into another rectilinear motion (of the part 14) but to have part 14 execute a rotary movement, camming surfaces 13 and 14, see FIG. 4 in particular, are each bent into a circle. An example of such a device according to the invention for the conversion of a rectilinear motion into a rotary motion is shown in FIG. 5 in vertical section through the axis, the parts being made for synthetic material.

In this figure the input to the driving part is shown at 20, the driving part that corresponds to the part 11 of FIG. 4 is shown at 21 and the rotary driven part at 22. These parts are disposed in a housing 23 which surrounds the hub 24 of the rotary part concentrically. In this housing there is fixed by means of screws 26 a supporting plate 28 on which is mounted the device that produces the axial movement, for example an electro-magnet (not shown). This device sets the input part 20 in axial movement against the action of a spring 32 that corresponds to the spring 17 of FIG. 4. The input part 20 has secured to its by means of a screw 30 a boss 31 that fixes a pressure plate 36 which acts via roller members 38 on a pressure ring 40. The pressure plate 36, the roller members 38 and the pressure ring 40 together form a ball thrust bearing which corresponds to the roller 18 of FIG. 3 and not to the spring members 3 or 5 of FIGS. 1 and 2 or 12 of FIG. 3.

Boss 31 carries the driving part 21 which however is coupled to the pressure ring 40 for rotation therewith. The coupling of these two parts may depend entirely on friction or the parts may be positively coupled by projections 21a on the driving part 21, these projections engaging in recesses 40a in the pressure ring. In the driving part 21 are mounted radially extending axles 44 which carry cam followers constituted by freely rotatable rollers 46, 48. At least two and preferably four or more such axles are provided. The rollers 46, 48 correspond to the rollers 12 of FIG. 3.

The rollers 46 cooperate with stationary inclined camming surfaces 50 that correspond to the surfaces 13 of FIG. 3, and the rollers 48 cooperate with camming surfaces 52 that correspond to the camming surfaces 14a of FIG. 3. Camming surfaces 50 are formed on a stationary part 51 non-rotatably connected to the housing 23. Accordingly, the camming surfaces 52 must be on the rotary driven part 22, 24 that corresponds to the rotary member 14 of FIG. 3. It will be appreciated that the rollers 48 correspond to those rollers 12 of FIG. 4 that cooperate with the part 14.

The rotary driven part 22, 24 is supported by ball-bearing races 56 and 58 and balls 60 on the stationary part 51 and thus indirectly by the housing 23. The hub 24 projects outwardly from the housing 23; this is the part from which is taken the rotary motion which is the final conversion product of the initial rectilinear motion and it thus corresponds to the part 14 which in FIGS. 3 and 4 is shown projecting outwardly at the right hand side.

The operation of the device illustrated in FIG. 5 is as follows.

If the input part 20 moves axially downwards, the driving part 21 follows this movement via the ball-bearing 38, the rollers 46 rolling on the camming surface 50 of the stationary part 51 firmly connected to the housing, this imparting rotary motion to the driving part 21. This rotary motion is transmitted via the rollers 48 and the surfaces 52 to the rotary part 22, 24, the latter not only having this rotary motion imparted to it but also a further rotary motion resulting from the rollers 48 moving axially downwards and thereby imparting additional rotary motion to the driven part, as has been explained in detail with reference to FIGS. 3 and 4. The downward movement of the input part 20 results in compression of the spring 32. After cessation of the axial downward force, the parts 20, 36, 21, 22 return to their initial positions either by the driving part being returned to its initial position by means of a spring which is not illustrated but corresponds to the spring 18 of FIG. 3 or due to the spring 32 being used simultaneously as a torsion spring in which case this spring not only causes return of the driving part 20, 36, 21 to the initial position but also causes the rotary driven part 22 to return to its initial position.

The part 51 has projections 51a that engage in recesses 22a in the driven part 22. This has the effect that only a limited relative movement is possible between the parts 22 and 51. Part 24 has a star-shaped profile 24a which engages with a star-shaped profile 23a of the housing with so much play that the final rotation of the part 24 relative to the stationary parts of the device is possible, but no more.

It will be seen that the parts 22 and 51 are essentially disc-like parts which are provided like crowns with axially upwardly projecting teeth 50, 52 forming the inclined surfaces corresponding to 13 and 14a of FIG. 3. These teeth are of sawtooth form and the inclined flanks of these teeth are of oppositely directed inclinations, as can be seen from FIG. 3 with reference to the flanks 13 and 14a.

The fact that in accordance with the invention the angles of inclination of the movement converting flanks 50 and 52 are of appreciable size without the customary magnitude of the rotary movement needing to be reduced, and further the fact that only half the pressure acting on the input part 20 needs to be transmitted between each roller 46 and 48 and the associated camming surface 50 and 52, permits the manufacture of the cooperating parts 22 and 51 carrying the said inclined surfaces from synthetic material. It is recommended in this connection that super polyamide synthetic materials be used or thermo-plastic synthetic materials of similar properties so that use can be made of the advantages that these materials offer as regards ease of working. The possibility of making these parts from synthetic material has a further advantage since the manufacture is much simplified as compared with the use of metal. The manufacture of metal parts with working surfaces inclined to the direction of the main axis (1a, 4a in FIG. 1; 13, 14a in FIG. 3) as already mentioned, extremely laborious.

What is claimed is:
1. A motion converting device comprising
   (1) a driving part mounted for rectilinear movement in the direction of an axis and for rotation about said axis;
   (2) a stationary part axially spaced from the driving part;
   (3) a first camming surface on one of said parts;
   (4) a first cam follower on the other one of said parts, the rectilinear movement of the driving part causing displacement of the cam follower relative to the camming surface and rotation of the driving part;
   (5) a rotary driven part axially spaced from the driving part;
   (6) a second camming surface on a selected one of the driving or driven parts; and
   (7) a second cam follower on the other one of said selected parts, the rotation of the driving part causing displacement of the second cam follower relative to the second camming surface and rotation of the driven part.
2. The motion converting device of claim 1, wherein the camming surfaces are concentric to each other.
3. The motion converting device of claim 2, wherein said cam followers are rollers, and further comprising a radially extending axle mounted on the driving part, the axle carrying the rollers for engagement with respective ones of the camming surfaces.
4. The motion converting device of claim 1, further comprising a rectilinear movement receiving input part associated with the driving part, the input part, the driving part and the driven part being coaxially mounted.
5. The motion converting device of claim 4, further comprising a ball thrust bearing mounted between the input and the driving parts.
6. The motion converting device of claim 1, further comprising ball thrust bearing supporting the driven part against axial displacement by the force of engagement between the second set of cam followers and the second camming surface.
7. The motion converting device of claim 1, further comprising stop means arranged between the stationary and the driven parts for limiting rotation of the driven part.
8. The motion converting device of claim 1, wherein the camming surfaces are of synthetic resin.
9. The motion converting device of claim 1, wherein the cam followers are of synthetic resin.
10. The motion converting device of claim 1, wherein the rotary driven part is held against axial movement.

References Cited by the Examiner

UNITED STATES PATENTS

| 2,973,748 | 3/1961 | Leland et al. | 74—89 X |
| 2,978,915 | 4/1961 | Metcalf | 74—89 |
| 3,101,622 | 8/1963 | Grondahl et al. | 74—89 |
| 3,124,009 | 3/1964 | Grover | 74—99 |

FOREIGN PATENTS

| 1,324,191 | 3/1963 | France. |

FRED C. MATTERN, JR., *Primary Examiner.*

BROUGHTON G. DURHAM, *Examiner.*

F. E. BAKER, *Assistant Examiner.*